US012557937B2

(12) United States Patent     (10) Patent No.:     US 12,557,937 B2
Ait Bouziad                      (45) **Date of Patent:      *Feb. 24, 2026**

(54) DISPENSING AND PREPARATION APPARATUS FOR POWDERED FOOD OR BEVERAGE PRODUCTS

(71) Applicant: SOCIETE DES PRODUITS NESTLE S.A., Vevey (CH)

(72) Inventor: Youcef Ait Bouziad, Echandens (CH)

(73) Assignee: Société des Produits Nestlé S.A., Vevey (CH)

( * ) Notice: Subject to any disclaimer, the term of this patent is extended or adjusted under 35 U.S.C. 154(b) by 516 days.

This patent is subject to a terminal disclaimer.

(21) Appl. No.: 18/002,924

(22) PCT Filed: Jun. 4, 2021

(86) PCT No.: PCT/EP2021/065036
§ 371 (c)(1),
(2) Date: Dec. 22, 2022

(87) PCT Pub. No.: WO2021/259615
PCT Pub. Date: Dec. 30, 2021

(65) Prior Publication Data
US 2023/0240471 A1      Aug. 3, 2023

(30) Foreign Application Priority Data

Jun. 24, 2020      (EP) ..................................... 20181828

(51) Int. Cl.
*A47J 31/44*           (2006.01)
*A47J 31/40*           (2006.01)
(Continued)

(52) U.S. Cl.
CPC ......... *A47J 31/4492* (2013.01); *A47J 31/404* (2013.01); *A47J 31/407* (2013.01);
(Continued)

(58) Field of Classification Search
CPC .. A47J 42/40; A47J 42/50; A47J 42/52; A47J 31/52–5255; B65D 81/24; B65D 81/32; B65D 83/06
See application file for complete search history.

(56) References Cited

U.S. PATENT DOCUMENTS 3,943,987 A * 3/1976 Rossi ................. B65D 81/2015
                                                       206/524.8
5,186,399 A * 2/1993 Knepler ................. A47J 42/38
                                                          241/34
(Continued)

FOREIGN PATENT DOCUMENTS

CN          101637357          2/2010
CN          103687519          3/2014
(Continued)

OTHER PUBLICATIONS

Russian Office Action for Appl No. 2022130353/03 dated Sep. 20, 2024, 6 pages.

*Primary Examiner* — Drew E Becker
(74) *Attorney, Agent, or Firm* — Thorpe North & Western, LLP

(57)                ABSTRACT

The present invention relates to a dispensing and preparation apparatus for powdered food or beverage products, the apparatus comprising a dispensing device (60) and an associated preparation or extraction device (70); the dispensing device (60) comprising one or more housings for receiving one or more containers (10, 20) with a powdered food or beverage product; the dispensing device (60) comprising a reader (62) to obtain the information of the product parameters of the powdered food or beverage products from the one or plurality of containers (10, 20); the dispensing device (60) further comprising a control unit configured to dispense a certain amount of powdered food or beverage product
(Continued)

from each container (10, 20) according to these product parameters and/or according to a recipes database (64) as a function of the beverage to be prepared; the dispensing device (60) further comprising an encoder (63) to encode the beverage information on programmable identification means (65) on a product holder (61) in the dispensing device (60), to where the dispensed powdered food or beverage product is sent; the preparation or extraction device (70) being configured for receiving the product holder (61) and comprising reading means (72) to identify the beverage information in the said product holder identification means (65), the extraction device (70) further comprising a control unit to extract the beverage according to the beverage information retrieved from the product holder (61) and/or from the beverage information retrieved from a beverage database in this control unit. The invention further relates to a method for dispensing powdered food or beverage products and preparing a beverage from them using a dispensing and extraction apparatus as the one described. The invention also relates to the use of a dispensing and extraction apparatus as the one described for delivering a certain beverage from powdered food or beverage products.

13 Claims, 20 Drawing Sheets

(51) Int. Cl.
  A47J 31/52 (2006.01)
  B65D 81/24 (2006.01)
  B65D 81/32 (2006.01)
  B65D 83/06 (2006.01)
(52) U.S. Cl.
  CPC ............. A47J 31/446 (2013.01); A47J 31/52 (2013.01); B65D 81/24 (2013.01); B65D 81/32 (2013.01); B65D 83/06 (2013.01)

(56) References Cited

U.S. PATENT DOCUMENTS

| | | | | |
|---|---|---|---|---|
| 6,238,721 | B1 * | 5/2001 | Knepler | A47J 42/38 |
| | | | | 426/590 |
| 6,626,085 | B1 * | 9/2003 | Lassota | A47J 31/42 |
| | | | | 241/36 |
| 7,264,186 | B2 * | 9/2007 | Lassota | A47J 42/50 |
| | | | | 241/36 |
| 7,934,670 | B2 * | 5/2011 | Ford | A47J 42/50 |
| | | | | 241/285.2 |
| 8,306,655 | B2 * | 11/2012 | Newman | B67D 1/0882 |
| | | | | 700/239 |
| 8,463,447 | B2 * | 6/2013 | Newman | B67D 1/0882 |
| | | | | 700/239 |
| 9,670,047 | B2 * | 6/2017 | Carpenter | B67D 1/0041 |
| 2011/0094391 | A1 * | 4/2011 | Erba | A47J 42/40 |
| | | | | 99/317 |
| 2012/0219686 | A1 | 8/2012 | Bombeck et al. | |
| 2013/0156903 | A1 | 6/2013 | Bombeck et al. | |
| 2013/0220135 | A1 * | 8/2013 | Aigner | A47J 31/521 |
| | | | | 99/285 |
| 2013/0291738 | A1 * | 11/2013 | Laithier | G01F 11/003 |
| | | | | 99/289 R |
| 2014/0314921 | A1 | 10/2014 | Kuempel et al. | |
| 2015/0060481 | A1 * | 3/2015 | Murray | A47G 19/34 |
| | | | | 222/1 |
| 2015/0135962 | A1 * | 5/2015 | Jarisch | G11C 7/1006 |
| | | | | 235/492 |
| 2015/0351583 | A1 | 12/2015 | Weigelt et al. | |
| 2017/0238753 | A1 * | 8/2017 | Merali | G08C 17/02 |
| 2019/0231146 | A1 * | 8/2019 | Dubief | A47J 42/52 |
| 2020/0133890 | A1 * | 4/2020 | Zehnder | G06F 13/4282 |
| 2020/0329900 | A1 * | 10/2020 | Dubief | A47J 31/401 |
| 2021/0338004 | A1 * | 11/2021 | Alsayar | B65D 85/8058 |
| 2022/0175179 | A1 * | 6/2022 | Dubief | A47J 31/4403 |
| 2024/0008675 | A1 * | 1/2024 | Torizu | A47J 31/525 |
| 2024/0197106 | A1 * | 6/2024 | Carlins | A47J 31/4403 |
| 2025/0221563 | A1 * | 7/2025 | Perentes | A47J 31/4492 |

FOREIGN PATENT DOCUMENTS

| | | |
|---|---|---|
| CN | 103796562 | 5/2014 |
| CN | 203793947 | 8/2014 |
| CN | 104379033 | 2/2015 |
| CN | 105228496 | 1/2016 |
| CN | 105592758 | 5/2016 |
| CN | 106659320 | 5/2017 |
| CN | 109526210 | 3/2019 |
| CN | 109788873 | 5/2019 |
| CN | 111093443 | 5/2020 |
| EP | 2314188 | 4/2011 |
| KR | 20200083475 A | 7/2020 |
| NL | 2002720 | 10/2010 |
| RU | 2718646 C2 | 4/2020 |
| TW | M550609 | 10/2017 |
| WO | 2018069182 | 4/2018 |

* cited by examiner

DISPENSING AND PREPARATION APPARATUS FOR POWDERED FOOD OR BEVERAGE PRODUCTS

CROSS REFERENCE TO RELATED APPLICATIONS

The present application is a National Stage of International Application No. PCT/EP2021/065036, filed on Jun. 4, 2021, which claims priority to European Patent Application No. 20181828.3, filed on Jun. 24, 2020, the entire contents of which are being incorporated herein by reference.

1. FIELD OF THE INVENTION

The present invention relates to an apparatus for dispensing a certain amount of a powdered food or beverage product and to an associated preparation apparatus for preparing a beverage from it (by dissolution and/or brewing and/or infusion, etc.). The invention further relates to an associated method for dispensing and preparing powdered food or beverage products.

2. TECHNICAL BACKGROUND

In all domains of food and beverage preparation, the quality of the prepared food or beverage requires, at least: adequate quality of the raw product; right tools (machines, devices, etc.) and knowledge and skills to ensure the right preparation processes.

Hot beverage preparation, more particularly coffee preparation and its derivates, also obey the same rules.

Since the very first invention of a coffee extraction machine, the associated techniques have heavily evolved during the last decades. It is known in the state of the art that the first machine for making espresso was built and patented in 1884 by Angelo Moriondo of Turin, Italy. An improved design was later patented on Apr. 28, 1903, by Luigi Bezzera. The founder of the La Pavoni company bought the patent and from 1905 produced espresso machines commercially on a small scale in Milan. Multiple machine designs have been created to produce espresso. Several machines share some common elements, such as a group head and a portafilter. An espresso machine may also have a steam wand which is used to steam and froth liquids (such as milk) for coffee drinks such as cappuccino and caffe latte.

Single serve based systems for preparing food or beverages, typically from the starting product comprised in a container, preferably a capsule, are well known in the state of the art. Capsule-based systems have put beverage and food extraction and/or reconstitution on a higher level in terms of:

quality (in-cup results);
easiness and user friendliness;
repeatability of results.

The fact that the product used is controlled in factories until the last step (roasting, dosing, grinding) and that is tailored to the dedicated extraction system, positions the single serve system potentially higher in terms of end cup quality. Additionally, certain systems in the market use also a coding system to adapt the machine extraction parameters to the right capsule (product) used to get the best out of it.

However, the ecological impact of such systems, as well as the cost per serve, are high, especially when ending with complex technical packaging, as the capsule is used as an extraction cell, including complex functions such as water diffuser or jet, opening membrane, air suction system, filter, pyramid plate . . . etc.

The main object of the present invention is to achieve similar end results of the coffee beverage delivered than those obtained when using a capsule system without the need of using any single serve packaging, and without any specific skills being needed. The invention achieves this by building a system comprising several main-devices that communicate between themselves via accessory-devices, that transfer/communicate the required parameters in order to replace a Barista know-how by an artificial intelligence (AI) system.

The system of the invention adjusts the parameters of each main-device (the inputs), according to the outputs of the main-device used in the previous phase. The goal is to ensure the integrity of the procedure and the information by communicating the right parameters to be used.

Fully automatic beverage preparation machines are known in the state of the art and are widely used for preparing coffee beverages. These automatic machines provide a fully automatic process, starting with storing the roasted coffee beans and ending with the delivery of the coffee beverage into a cup. Differently to a fully automated machine, the system of the invention allows more flexibility by using different accessory-devices, tailored to the right preparation, between the main-devices. Typically, these accessory-devices are devices for espresso, drip coffee, soluble coffee, etc.

Differently to single serve systems (typically those using capsules), the system of the present invention does not use a single packaging for each beverage preparation, but a multipack, and uses accessory-devices for extraction/processing.

These and other objects, which become apparent upon reading the following description, are solved by the subject matter of the independent claim. The dependent claims refer to preferred embodiments of the invention.

3. SUMMARY OF THE INVENTION

According to a first aspect, the invention relates to a dispensing and preparation apparatus (by dissolution and/or brewing and/or infusion, for example) for powdered food or beverage products, the apparatus comprising a dispensing device and an associated preparation or extraction device. The dispensing device comprises one or more housings for receiving one or more containers with a powdered food or beverage product; the dispensing device comprising a reader to obtain the information of the product parameters of the powdered food or beverage products from the one or plurality of containers. The dispensing device further comprises a control unit configured to dispense a certain amount of powdered food or beverage product from each container according to these product parameters and/or according to a recipes database as a function of the beverage to be prepared. The dispensing device further comprises an encoder to encode the beverage information on programmable identification means on a product holder in the dispensing device, to where the dispensed powdered food or beverage product is sent. The preparation or extraction device is configured for receiving the product holder and comprising reading means to identify the beverage information in the said product holder identification means, the extraction device further comprising a control unit to extract the beverage according to the beverage information retrieved from the product holder and/or from the beverage information retrieved from a beverage database in this control unit.

Preferably, in the dispensing and extraction apparatus for powdered food or beverage products, the product parameters comprises one or a plurality of the following data: product type, product origin, date of production, production data, list of ingredients, date of expiration, company data and or marketing info.

Typically, in the dispensing and extraction apparatus for powdered food or beverage products according to the invention, the beverage information comprises one or a plurality of the following data: beverage type and associated preparation process (dissolution, brewing, infusion . . . ), beverage volume, beverage temperature and/or extraction pump profile.

Preferably, the product holder comprises plugging means to be quickly plugged and/or unplugged onto the dispensing device and onto the extraction device so it is freely exchangeable (plug & play).

According to a preferred embodiment, the product holder is locked on the dispensing device and on the extraction device to allow firm fix of it during the dispensing and the extraction operations, respectively.

Typically, in the dispensing and extraction apparatus for powdered food or beverage products according to the invention, the containers with the powdered food or beverage products comprise identification means with the characteristics of these powdered food or beverage products, to be read by the reading means in the dispensing device, these identification means being optical, such as a barcode, OID and/or a QR code, and/or electromagnetically read identification means such as a RFID tag.

Preferably, in the apparatus of the invention, the one or plurality of containers have an embedded dosing device to dose only the needed quantity of powdered food or beverage product into the product holder. Typically, the one or plurality of containers are oxygen and/or humidity and/or light barrier during storage and/or dispensing. More preferably, the one or plurality of containers are tight, allowing no air exchange with the product during storage and/or dispensing.

According to a preferred embodiment, the dispensing device comprises a motor and a drive to control the embedded dosing device of the one or plurality of containers to dose only the needed dose of powdered food or beverage product into the product holder.

Preferably, the dispensing device comprises a RFID tag reader to obtain the information of the product parameters of the powdered food or beverage products of the one or more containers connected to it.

According to a second aspect, the invention relates to a method for dispensing powdered food or beverage products and preparing a beverage from them using a dispensing and extraction apparatus as the one described, the method comprising the following steps:

reading the product parameters in the one or plurality of containers;

dispensing a certain quantity of powdered food or beverage product from one or a plurality of containers plugged in the dispensing device;

carrying out the dispensing as to dispensed quantity according to the product parameters read and/or according to a recipes database;

encoding the beverage information on the product holder in the dispensing device;

transferring the product holder to the extraction device manually or automatically;

reading the beverage information from the product holder by the extraction device and extracting the beverage according to the beverage information retrieved and/or from the beverage information retrieved from a beverage database.

Yet another object of the invention is the use of a dispensing and extraction apparatus as the one described for delivering a certain beverage from powdered food or beverage products.

Further features, advantages and objects of the present invention will become apparent for a skilled person when reading the following detailed description of non-limiting embodiments of the present invention, when taken in conjunction with the appended drawings.

4. DESCRIPTION OF A PREFERRED EMBODIMENT

In the following, the invention is described exemplarily with reference to the enclosed figures, in which FIG. 1 is an exemplary functional diagram of a roasting, grinding, extraction system according to an embodiment of the invention.

The main goal of the present invention is to achieve similar end results as the ones achieved with a capsule system without using any single serve packaging, and without specific skills needed. The goal of the invention, as it will be explained in more detail in what follows, is to build main-devices that communicate among them via accessory-devices, that transfer/communicate parameters in order to replace the Barista (skilled person) know-how by an AI (Artificial Intelligence) system.

The system of the present invention adjusts each main-device parameters (inputs), according to the outputs of the main-device used in the previous phase. The goal is to ensure the integrity of the procedure and of the information by communicating the right parameters to be used.

In difference to fully automated machines, the system of the invention further allows more flexibility by using different accessory-devices (tailored to the right preparation: typically accessory devices for Espresso, Drip coffee, Soluble Coffee, etc.) between the main-devices.

In difference to single serve systems (typically preparing a beverage from a capsule or single-dose container), the system of the invention does not use a single packaging for each preparation, but a multipack, and uses accessory-devices for the extraction/processing.

Figure 1:
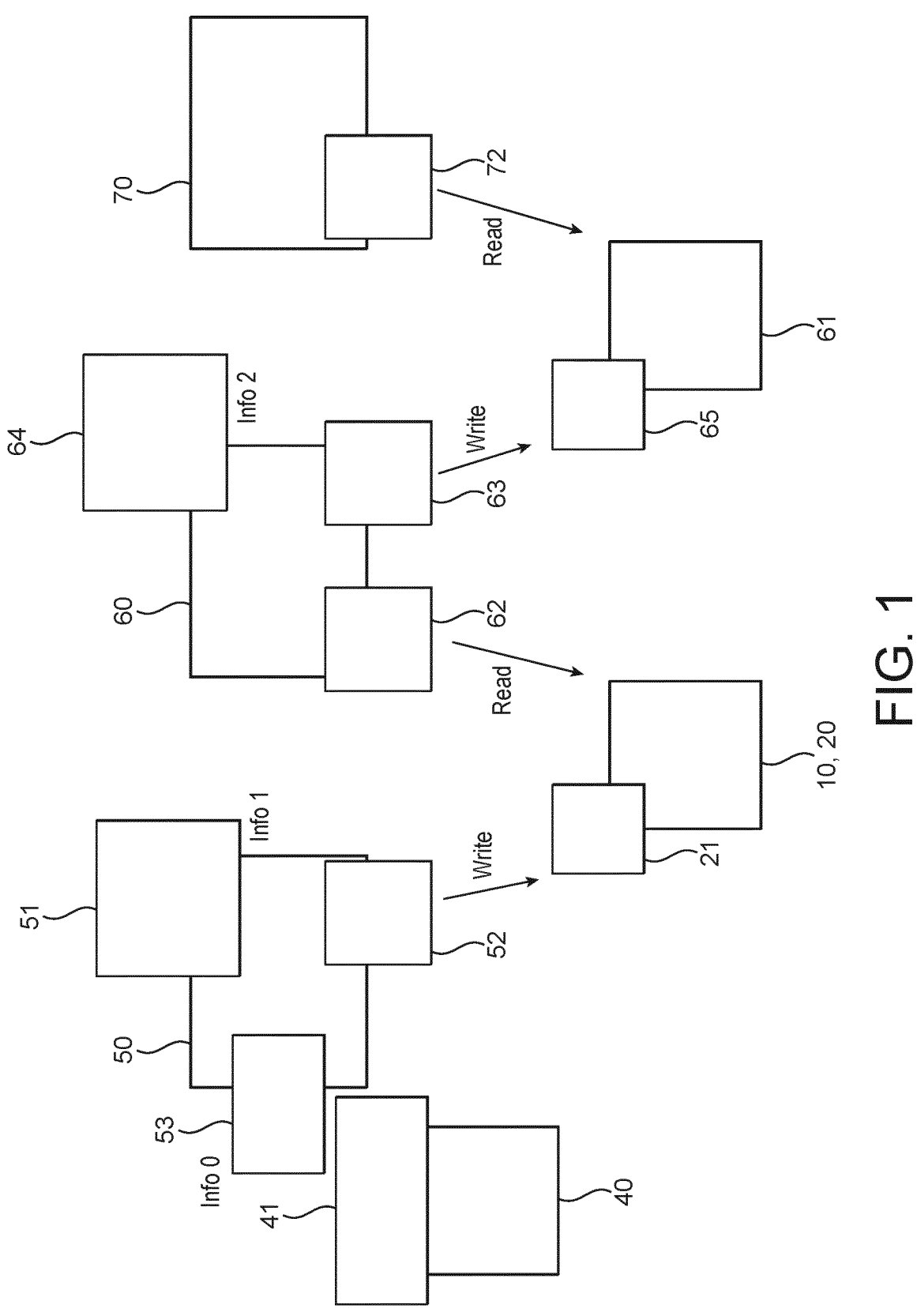

Looking at FIG. 1, it shows a roasting device 50 comprising a reader 53 and an encoder 52. The reader 53 is able to retrieve the information on the identification means 41 of a container 40 comprising coffee beans: these coffee beans can be green or partially roasted or a mixture of the two. The identification means 41 comprise the Information 0 of the coffee beans in the container 40, as represented schematically in FIG. 1. This Information 0 can comprise one or a plurality of the following information: coffee beans type, coffee beans origin, batch volume, recommended roasting level, date of expiration, etc. The identification means 41 in the container 40 can be optical (barcode, QR code, OID) or electromagnetically readable codes (typically, a RFID code). The roasting device 50 further comprises a control unit configuring the roasting profile of the beans according to the characteristics retrieved from the reading means 53 and/or from the characteristics of the beans in a database 51 in this control unit and/or according to the user's input. The roasting device 50 therefore makes the roasting of the green beans, partially roasted beans or the mixture of the two based on this information, and then delivers the roasted coffee beans into a beans container 10, 20. The beans container 10, 20 comprises programmable identification means 21 where product parameters of the roasted coffee beans of a certain type are encoded on it by an encoder 52 in the roasting device. The information encoded on the beans containers 10, 20 is named as Information 1 in the schematic diagram of FIG. 1, and this Information 1 comprises one or a plurality of the following information: Information 0 as explained above and roasting level, date of roasting, coffee origin, roasting profile, roasting date, etc.

The system of the invention further comprises a grinding device 60 comprising one or more housings for receiving one or more beans containers 10, 20. The grinding device 60 comprises a reader 62 to obtain the information of the product parameters (Information 1) of the roasted coffee beans of the one or more beans containers 10, 20. The grinding device 60 further comprises a control unit configured to adapt the grinding size and the quantity of roasted coffee beans to be delivered from the coffee beans containers 10, 20 for obtaining a certain coffee quantity and/or a certain coffee blend quantity from each beans container to be grinded according to these product parameters (Information 1) and/or according to a recipes database 64, and/or according to the user's input.

The grinded coffee is delivered from the grinding device 60 into a product holder 61: this product holder 61 comprises programmable identification means 65, where the encoder 63 in the grinding device 60 can encode the beverage information (called Information 2). This information will comprise one or a plurality of the following: beverage type, volume of the beverage to prepare, beverage temperature, pump profile, etc. The product holder 61 comprising the beverage information (Information 2) with the grinded coffee, will then be transferred to a preparation or extraction device 70, where the final beverage (the coffee beverage) will be prepared and delivered into a cup. The preparation device 70 comprises reading means 72 able to retrieve the beverage information (Information 2) from the identification means 65 in the product holder 61 and therefore make the beverage preparation (beverage extraction) according to this information.

Figure 2:
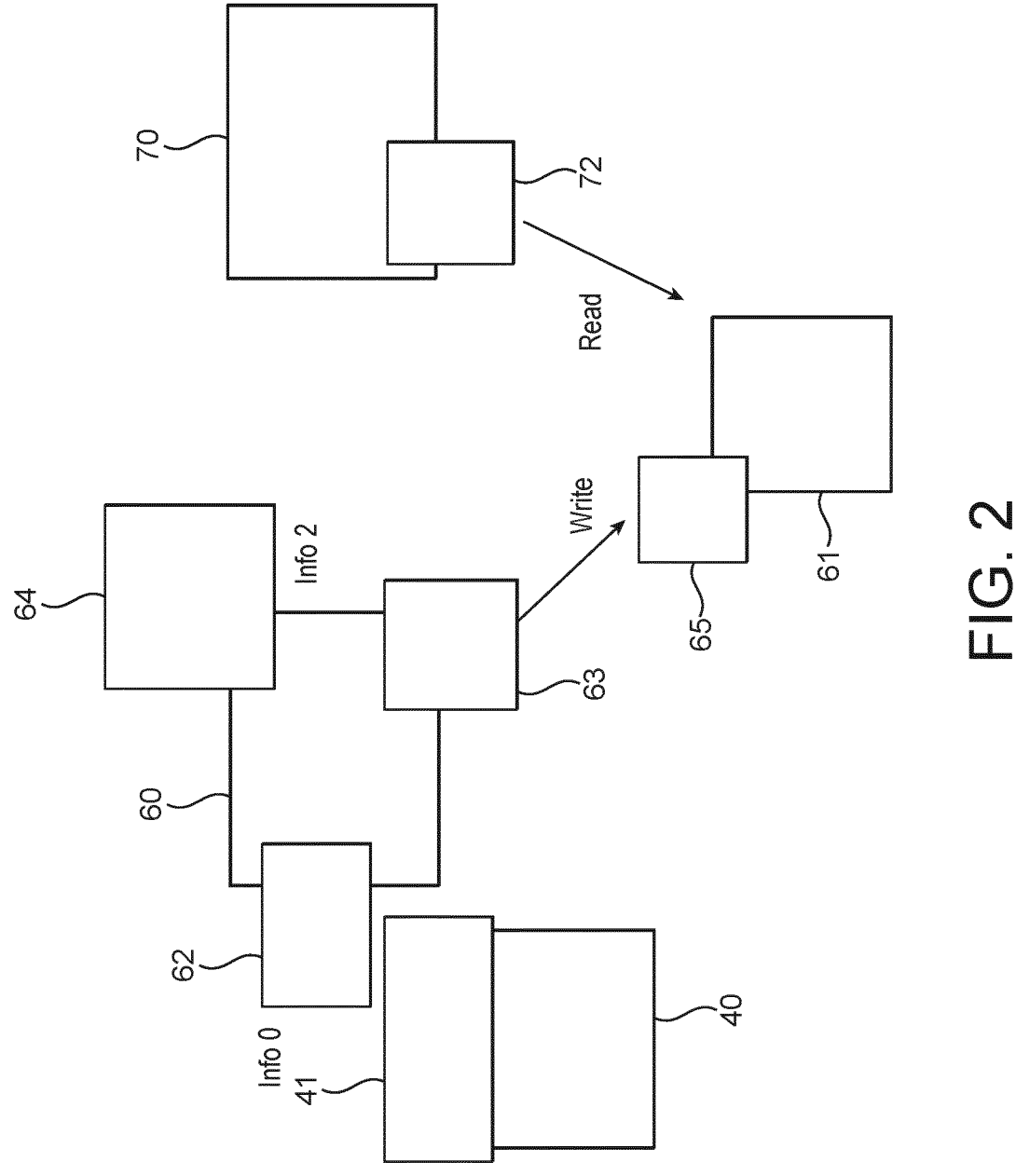
FIG. 2 is an exemplary functional diagram of a dosing, extraction system according to an embodiment of the invention.

Looking now at FIG. 2, an embodiment of the system of the invention is shown, particularly referring to a food product comprised in container 40 in the form of a powder. Similarly, the container 40 will be provided with identification means 41, optical (barcode, QR code, OID) or electromagnetically readable codes (typically, a RFID code) comprising the product information (Information 0 of the product type, such as coffee or milk, etc, and the date of expiration, for example). The system will comprise a dispensing device (60) comprising a reader 62 to retrieve the information on the product from the container 40 and therefore make the dosing according to this information (Information 0). The dispensing device 60 can also be a grinding device, as explained in the previous Figure. According to a preferred embodiment, the powdered product will be comprised in a container 10, 20. The dispensing device 60 further comprises a control unit configured to dispense a certain amount of powdered food or beverage product from a container (either 40 or 10, 20) according to these product parameters (Information 0) and/or according to a recipes database 64 as a function of the beverage to be prepared. The dispensing device 60 further comprises an encoder 63 to encode the beverage information (Information 2) on programmable identification means 65 on a product holder 61 in the dispensing device 60, to where the dispensed powdered food or beverage product is sent. Similarly as to the embodiment described in FIG. 1, the product holder 61 will be transferable into an extraction or preparation device 70 to prepare and dispense the final food or beverage product. The preparation device 70 will comprise a reader 72 to retrieve the beverage information (Information 2) from the identification means 65 in the product holder 61, and prepare the beverage accordingly. This Information 2 will comprise one or a plurality of the following: beverage type, volume of the beverage to prepare, beverage temperature, pump profile, etc.

Figure 3:
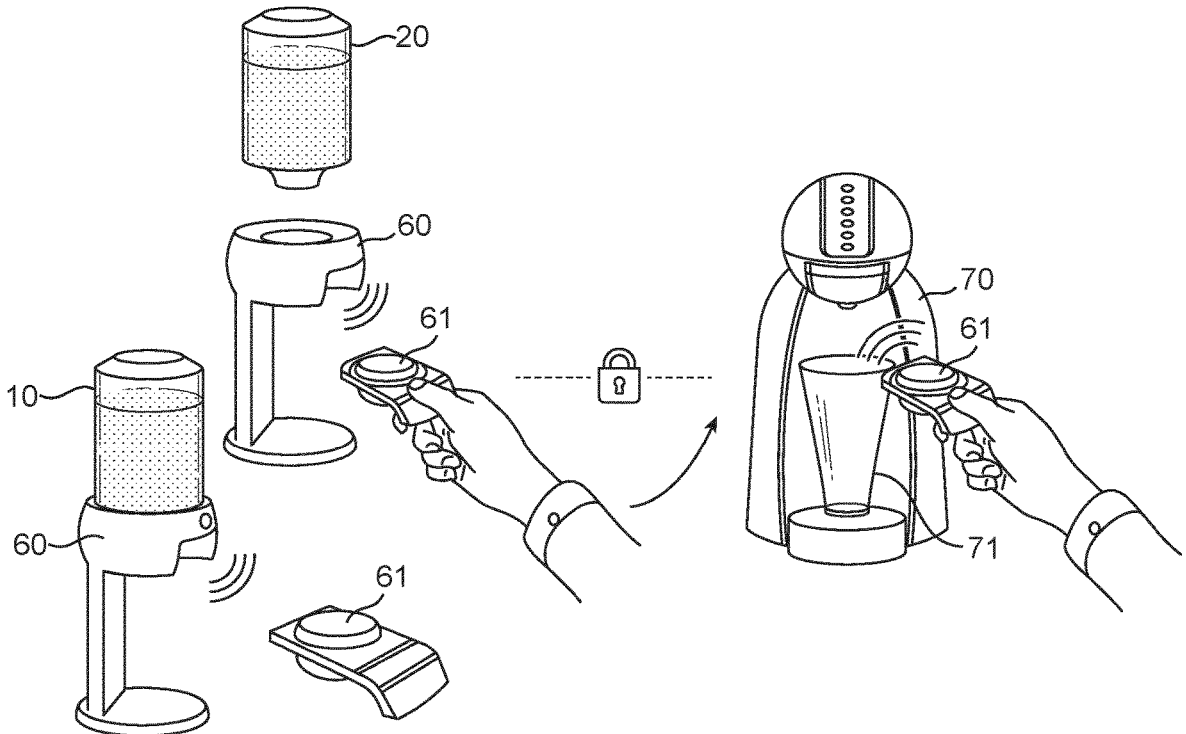
FIG. 3 is a schematic view of a dispensing, extraction system according to an embodiment of the invention.

The embodiment represented functionally in FIG. 2 is shown schematically in FIG. 3: a dispensing device 60 receives a certain product container 10 comprising a certain type of a powder product (milk in powder, for example). The dosing device 60 reads the identification means in this container 10 and so retrieves the product information, therefore knowing which amount of milk powder has to be delivered into the product holder 61 for a certain beverage to be prepared (according to the user's input and/or to the information retrieved in a recipes database 64). A container 20 with another type of powdered product (coffee, for example) is plugged into the dosing device 60. The dosing device will read the information on this product and will deliver the amount needed on the product holder 61 for the beverage to be prepared (according to the user's input and/or to the information retrieved in a recipes database 64). The encoder 63 in the dosing device 60 will then encode the beverage information (Information 2) on the product holder 61 according to the user's input and/or to a recipes database 64. When the product holder 61 will be plugged in a preparation device 70, for the beverage preparation, the Information 2 for the certain beverage extraction will be retrieved by the device 70 so the preparation will be done according to certain parameters.

Figure 4:
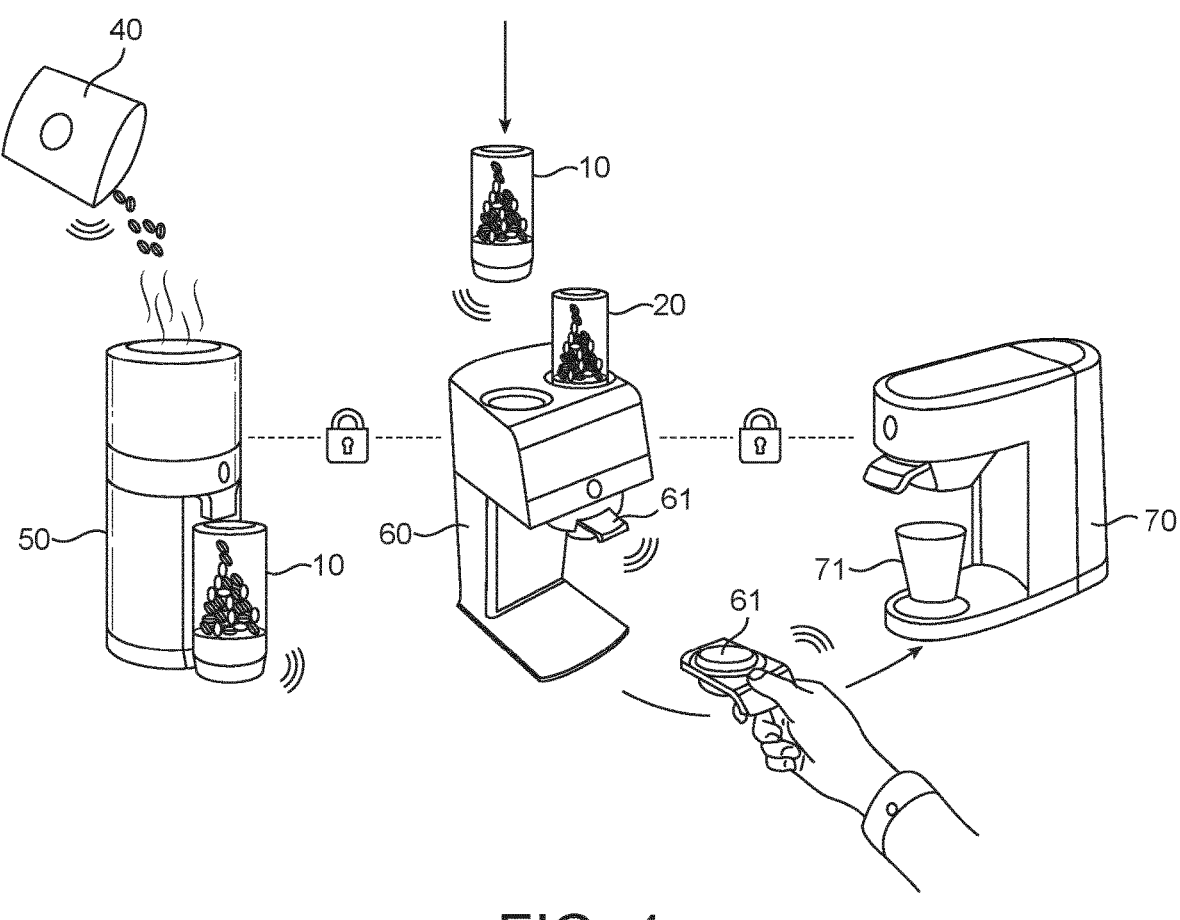
FIG. 4 is a schematic view of a roasting, grinding, extraction system according to an embodiment of the invention.

The functional diagram in FIG. 1 is represented schematically in FIG. 4. A container 40 with coffee beans (green and/or partially roasted) dispenses the beans into a roasting device 50. The Information 0 is read by the roasting device 50 so the roasting takes place according to certain parameters. The roasted coffee beans are delivered in a container 10. Similarly, a different type of coffee beans can be roasted in the roasting device 50 according to different parameters and can be delivered in a container 20. The containers 10, 20 can be plugged into a grinding device 60 where a certain amount of each one of the roasted beans from each of the containers 10, 20 can be sent into a product holder 61. This product holder 61 will be encoded with the beverage information (Information 2) so, when transferred into a dispensing or extraction device 70, the beverage preparation will take place according to certain parameters. The final beverage will be delivered into a cup 71, for example.

Figure 5:
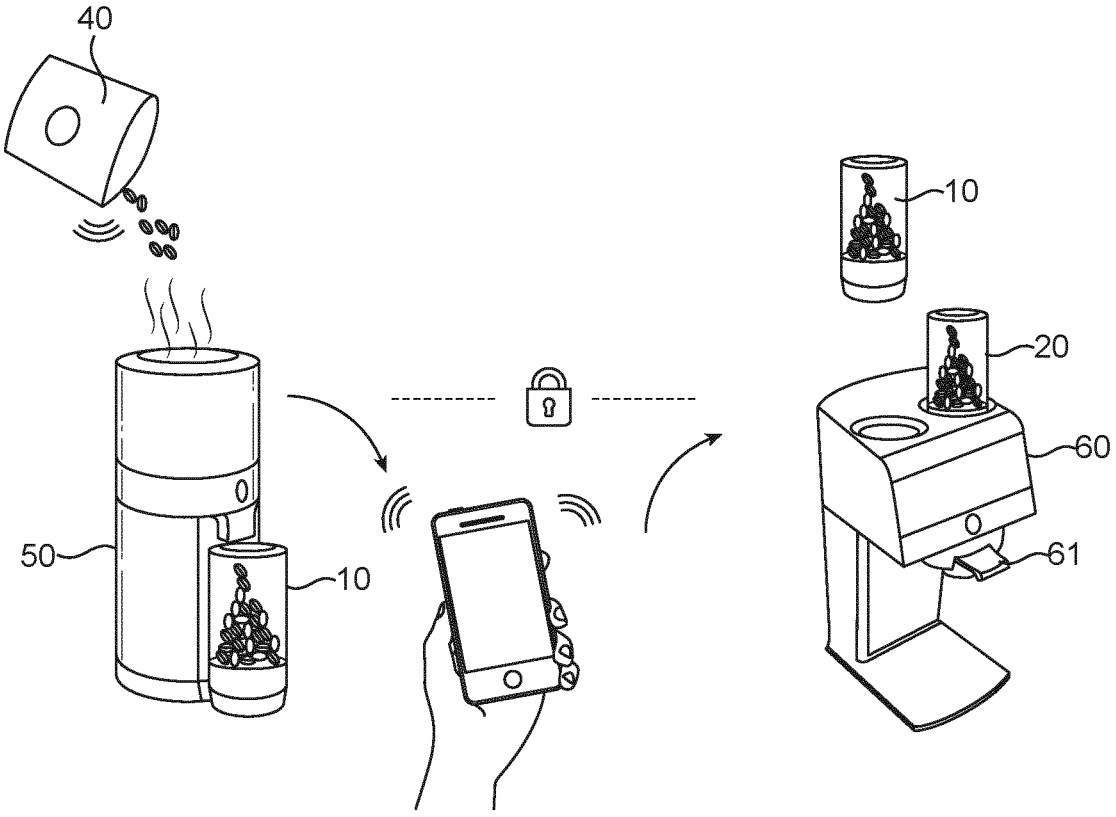
FIG. 5 is a schematic view of a roasting, grinding system according to an embodiment of the invention.

Still another embodiment of the system of the invention is represented in FIG. 5. The roasting device 50 is configured for receiving coffee beans of a certain type from a container 40: these beans will be roasted. The roasting device 50 comprises reading means 53 to identify the characteristics of the coffee beans dispensed to it, and further comprises a control unit configuring the roasting profile of the beans according to the characteristics retrieved from the reading means and/or from the characteristics of the beans in a database in this control unit and/or according to the user input. The roasted coffee beans are sent into a container 10 and are then transferred into a processing device 60. The processing device 60 can be a grinding device where the beans will be grinded (also another certain amount from a different container 20, sent to a product holder 61 that will then be transferred into a beverage preparation device 70 for the final beverage dispensing, or the processing device (not shown) can be a grinding device and a preparation or extraction device (functionalities of the device 60 and 70 together).

The roasting device 50 comprises a data transfer function to communicate product parameters of the roasted coffee beans of a certain type to the coffee processing device (grinding device or grinding and extraction device).

Figure 6:
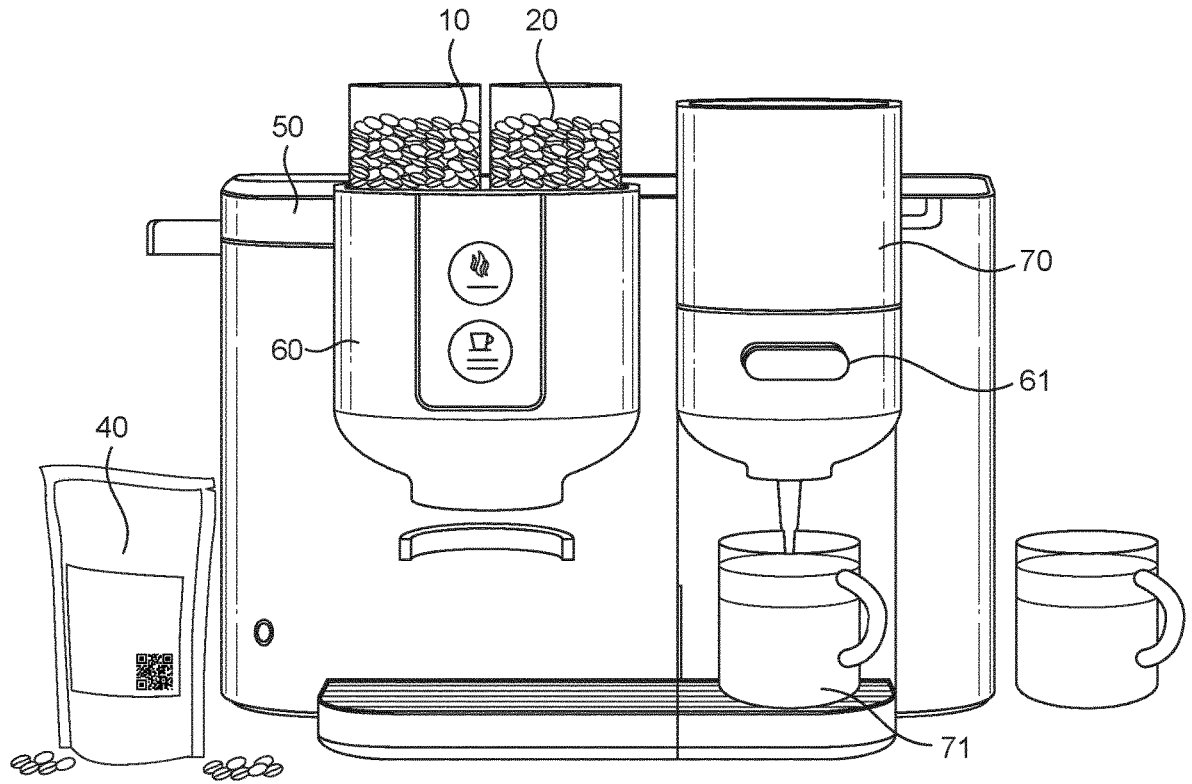
FIG. 6 is a schematic representative view of a roasting, grinding, extraction system according to an embodiment of the invention.

An schematic representation of the system of the invention is shown in FIG. 6. The container 40 comprises coffee beans (green and/or partially roasted) that will be roasted in the device 50 and sent into containers 10, 20 for different types of coffee beans. The containers 10, 20 will be plugged in a grinding device 60 to deliver a certain blend into a product holder 61 that, when plugged in a preparation device 70, will deliver the coffee beverage into a cup 71.

Figure 7:
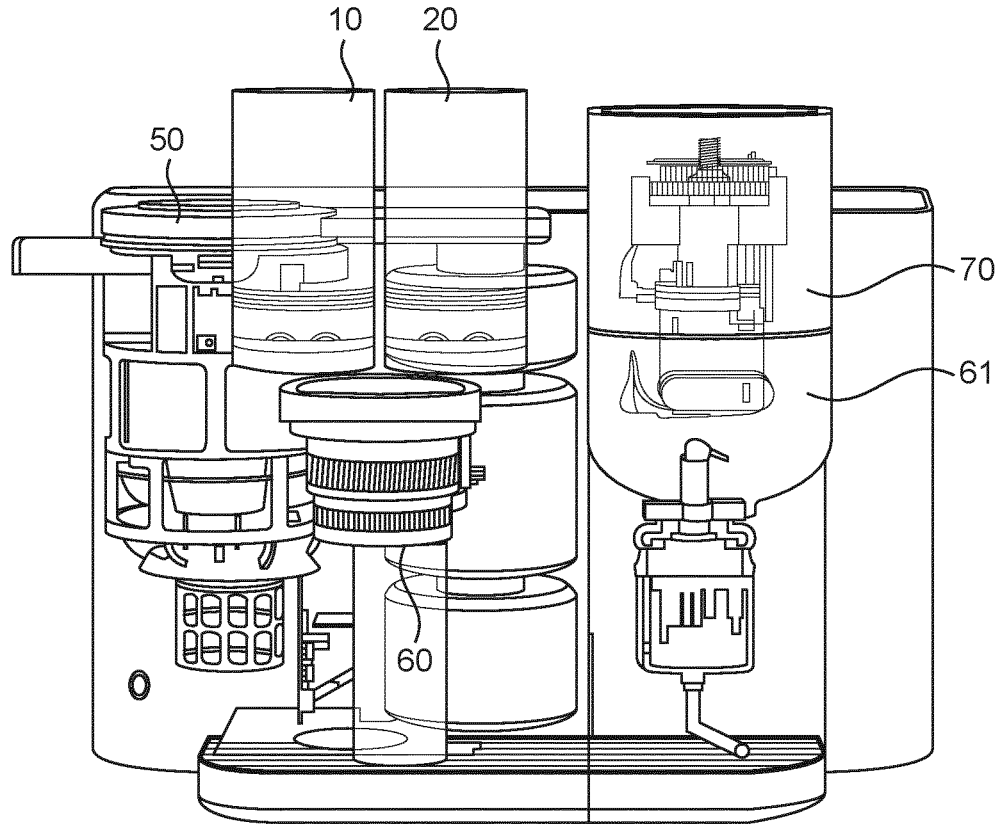
FIG. 7 is a schematic representative view of a roasting, grinding, extraction system according to an embodiment of the invention, showing the different elements belonging to it.

FIG. 7 represents the main components and connections of the system represented in FIG. 6, namely the roasting device 50, the containers 10, 20, the dispensing or grinding device 60 and the preparation or extraction device 70.

Figure 8:
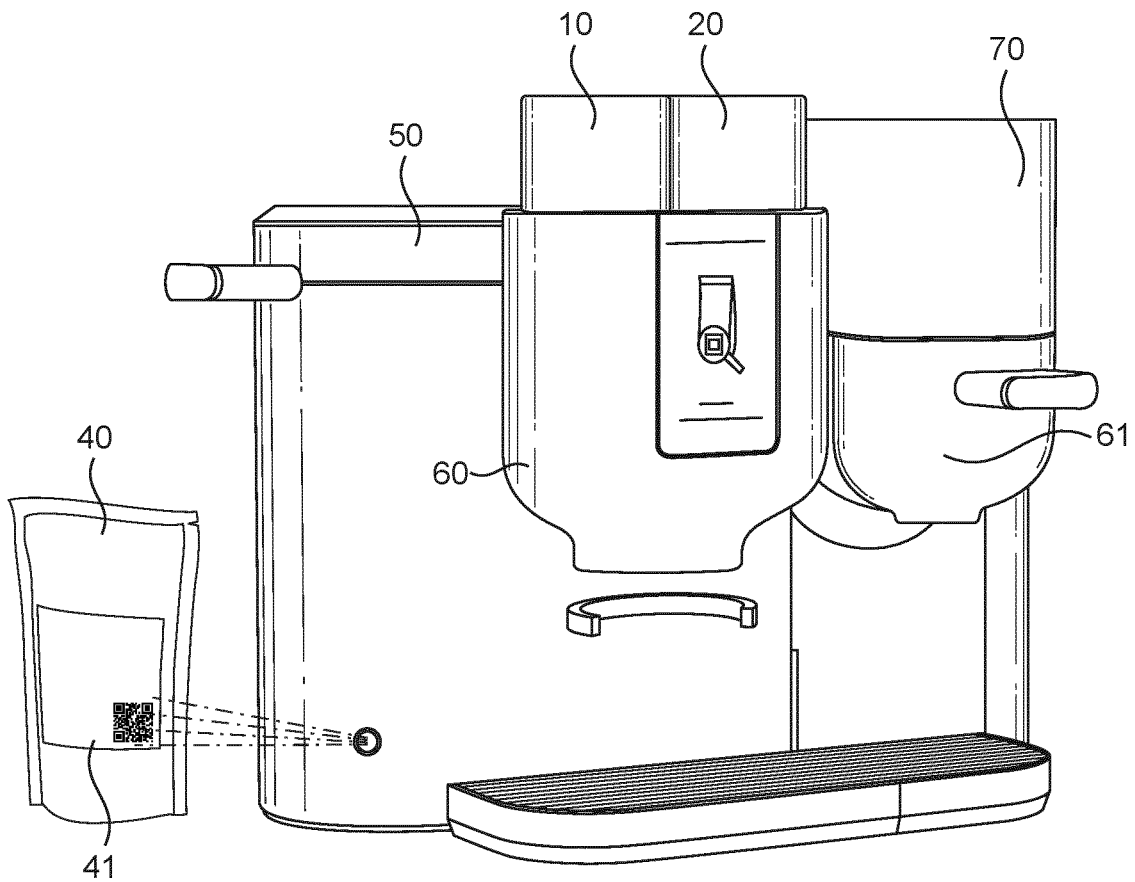
FIG. 8 is a schematic representative view of the roasting, grinding, extraction system in FIG. 7, showing the reading of identification means in the container comprising the coffee beans.

FIG. 8 shows the identification means 41 in the container 40 comprising the coffee beans. These identification means 41 will comprise the information on the coffee beans type and/or origin and/or the batch volume and/or date of expiration and/or recommended roasting level, amongst other information. The reading means 53 in the roasting device 50 will retrieve this information and will consequently do the roasting according to certain parameters.

Figure 9:
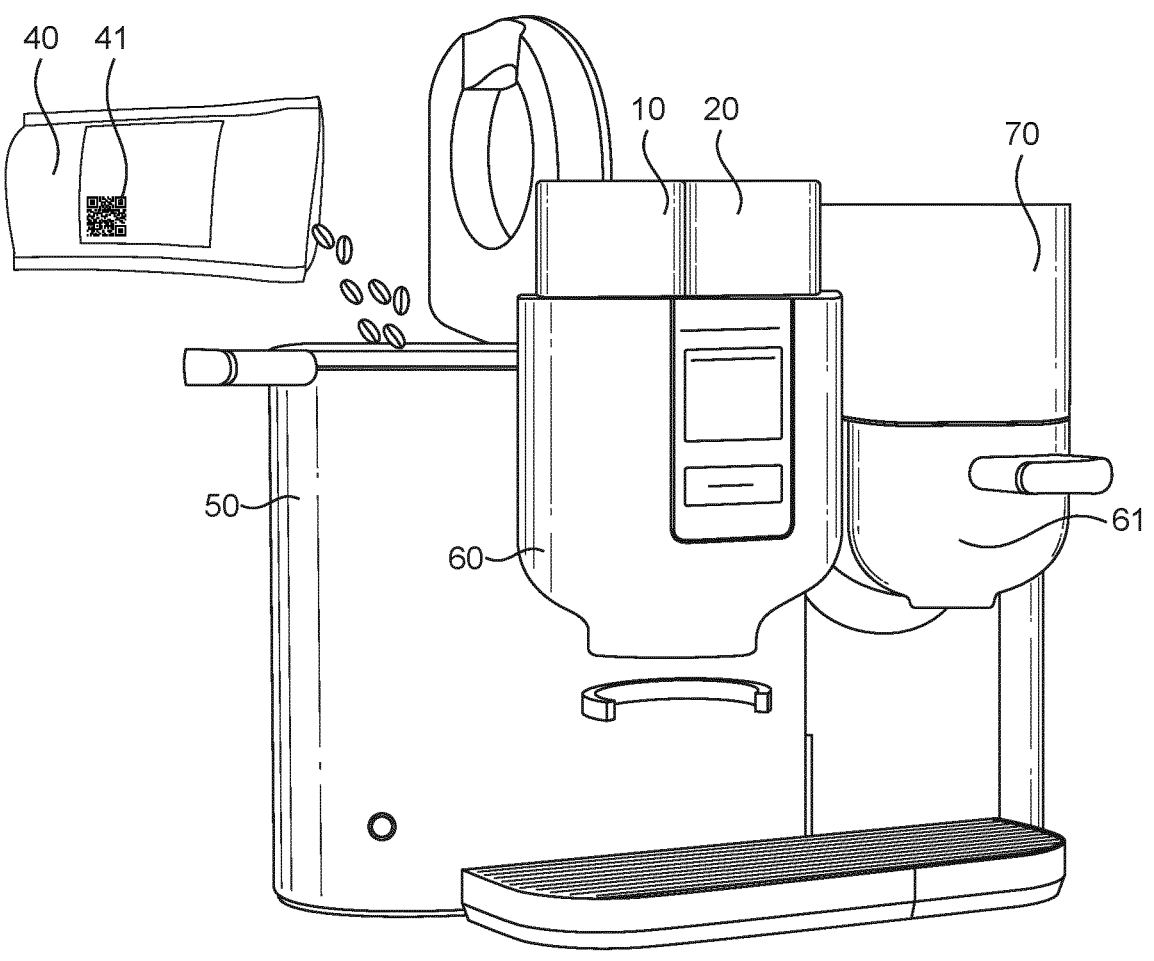
FIG. 9 is a schematic representative view of the roasting, grinding, extraction system in FIG. 7, showing the delivery of the coffee beans into the roasting device.
Figure 10:
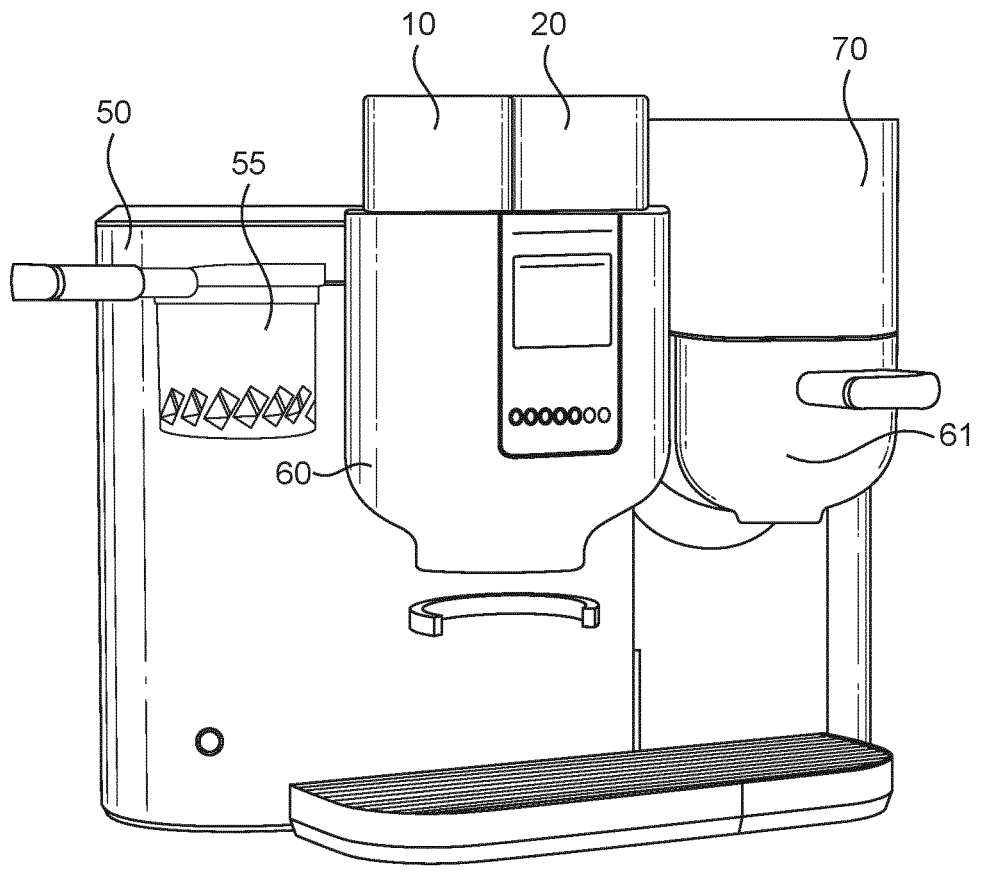
FIG. 10 is a schematic representative view of the roasting, grinding, extraction system in FIG. 7, showing the process of roasting the coffee beans in the roasting device.

FIG. 9 shows the beans from the container 40 being delivered into the roasting device 50 for being roasted, before being sent to one of the containers 10, 20 and then to the grinding device 60. FIG. 10 shows the roasting step of the beans (green and/or partially roasted) in the roasting device 50.

Figure 11:
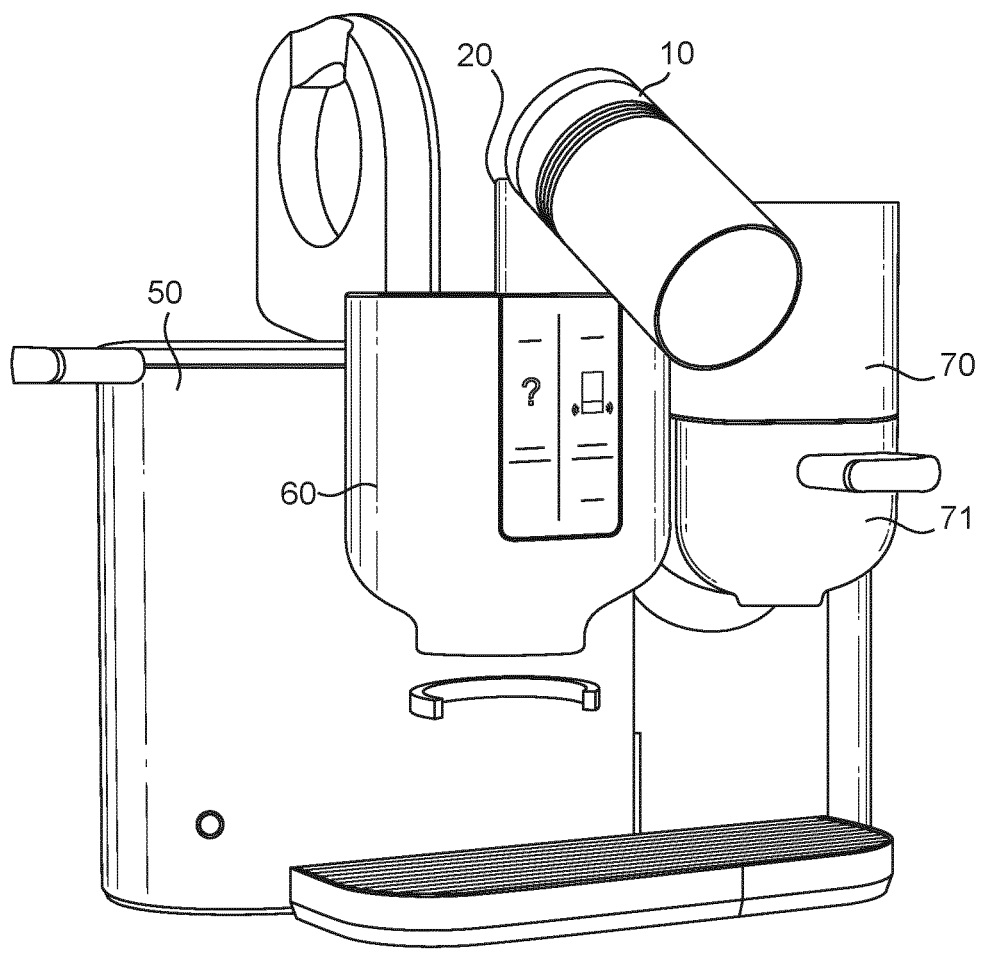
FIG. 11 is a schematic representative view of the roasting, grinding, extraction system in FIG. 7, showing the plugging of a container in the grinding or dispensing device.
Figure 12:
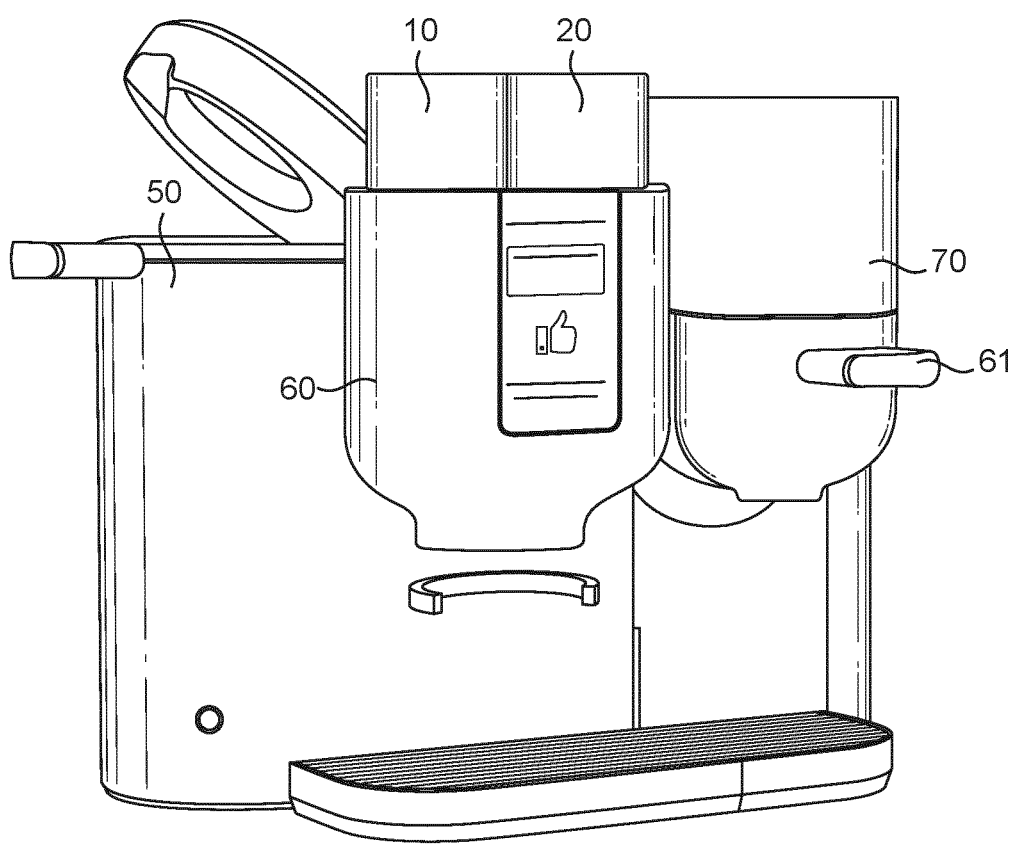
FIG. 12 is a schematic representative view of the roasting, grinding, extraction system in FIG. 7, showing two containers plugged in the grinding or dispensing device.
Figure 13:
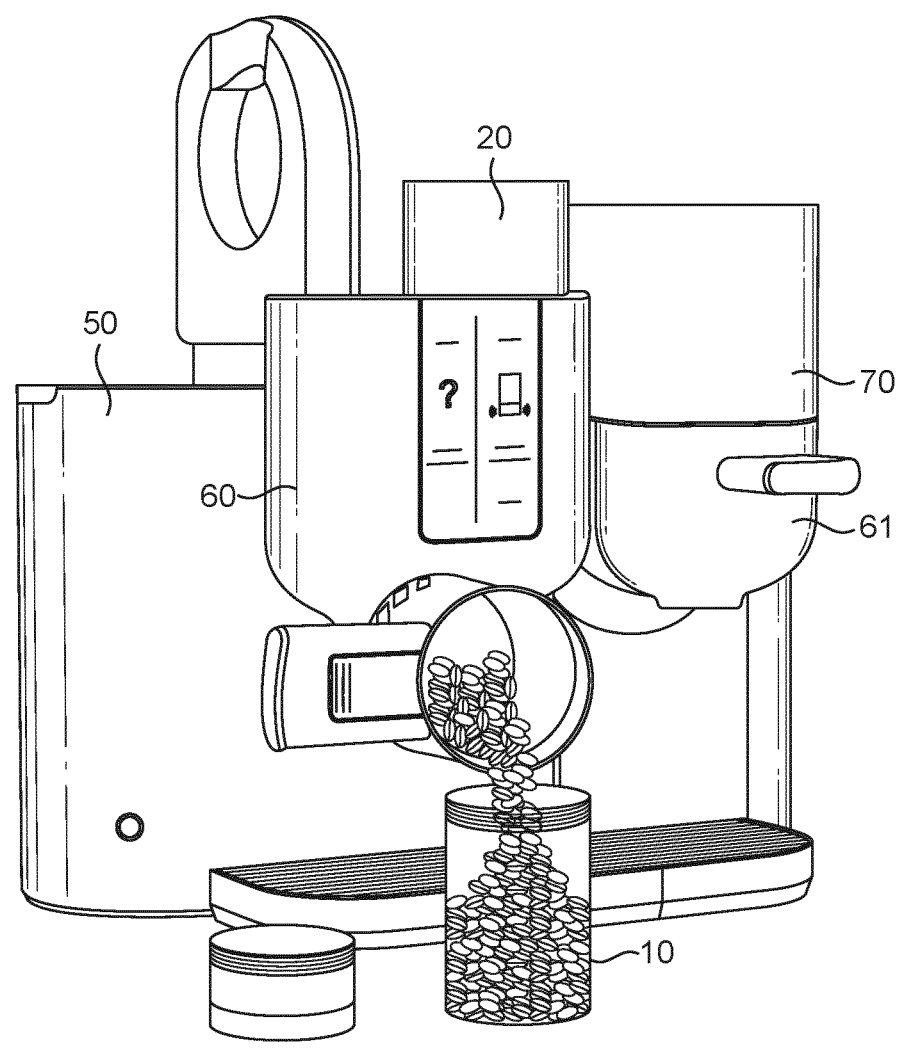
FIG. 13 is a schematic representative view of the roasting, grinding, extraction system in FIG. 7, showing the reading of identification means in the container comprising the coffee beans.
Figure 14:
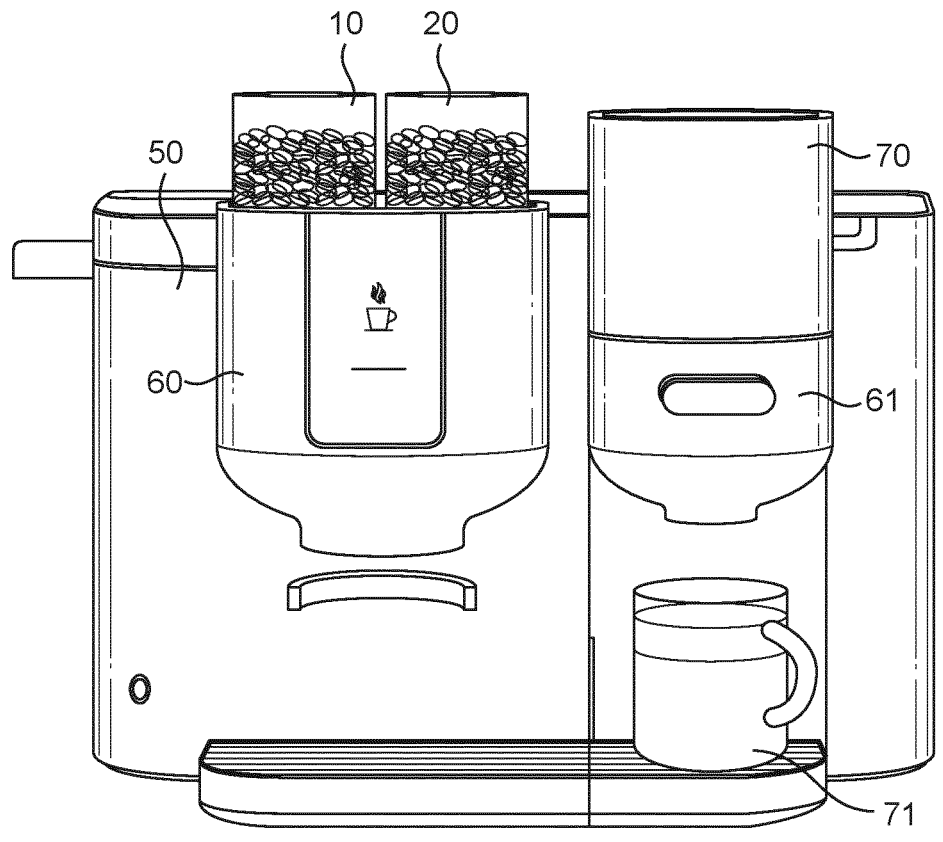
FIG. 14 is a schematic representative view of the roasting, grinding, extraction system in FIG. 7, showing the beverage finally dispensed in a cup.

The roasting device 50 opens (FIG. 12) and one of the containers 10 or 20 plugged in the grinding device 60 is unplugged from it (FIG. 11) so it can receive the roasted beans coming from the roasting device 50 (FIG. 13). Typically, the roasting device 50 will comprise a removable basket to where the unroasted and/or partially roasted beans are delivered from the container 40 and where they are later roasted. The basket will be able to be removed from the roasting device 50 and then the roasted beans can be sent into a container 10 or 20 that will be later plugged into a grinding device 60 (FIG. 14).

Figure 15:
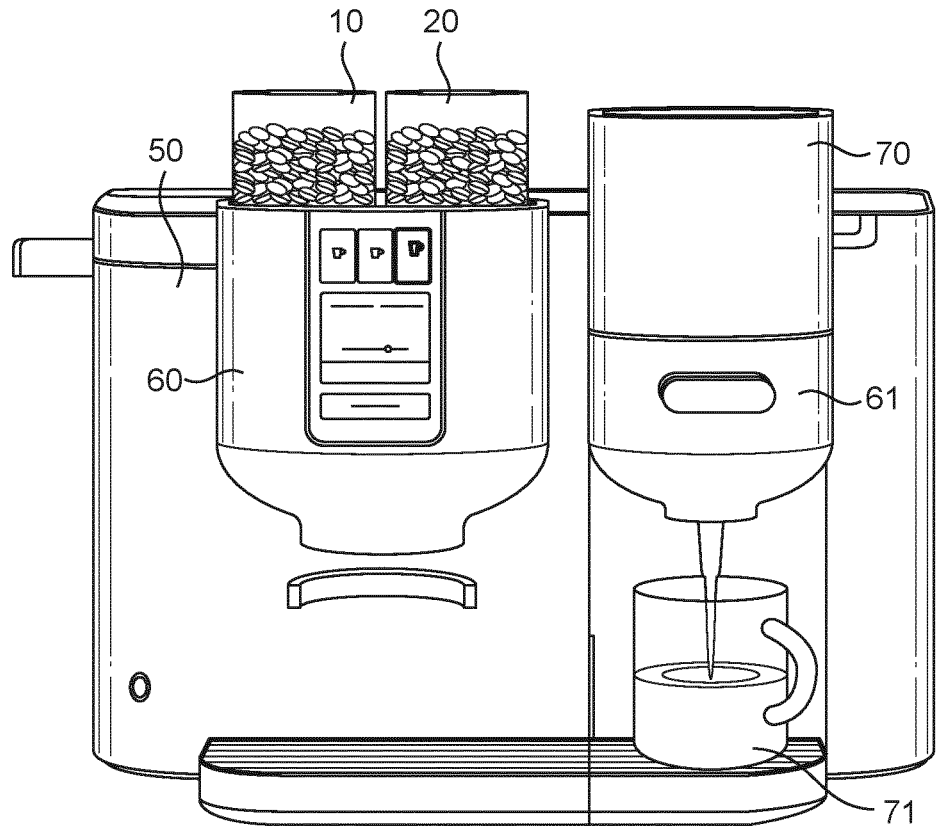
FIG. 15 is a schematic representative view of the roasting, grinding, extraction system in FIG. 7, showing the dispensing of the beverage in a cup.
Figure 16:
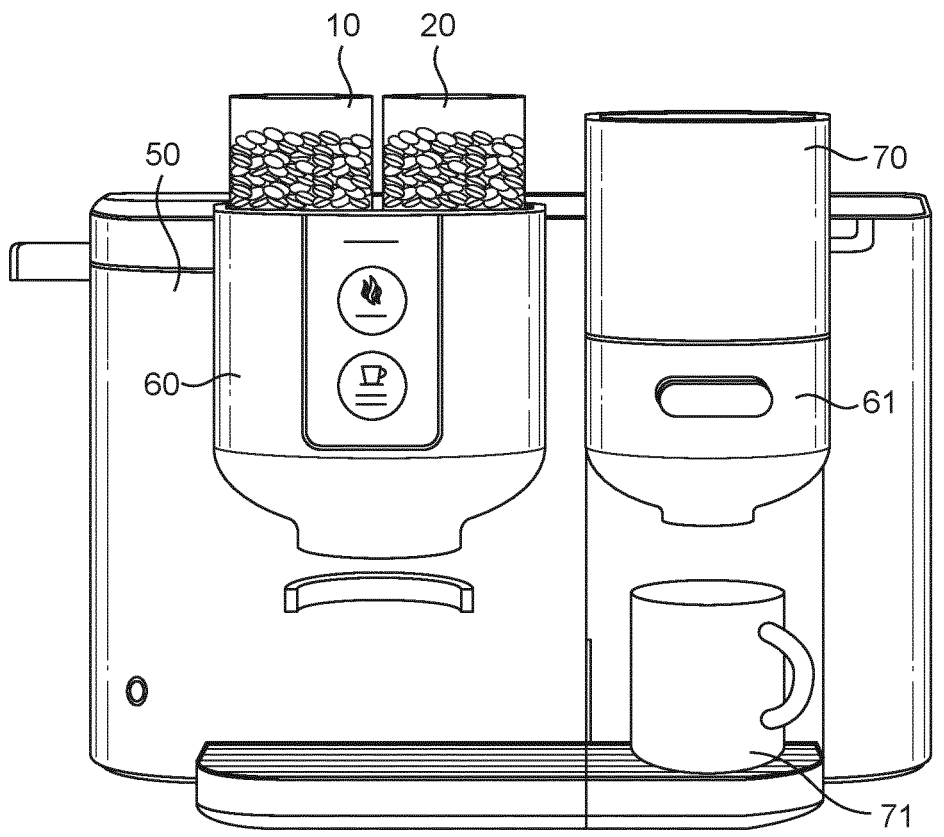
FIG. 16 is a schematic representative view of the roasting, grinding, extraction system in FIG. 7, showing the system prepared for dispensing a beverage.
Figure 17:
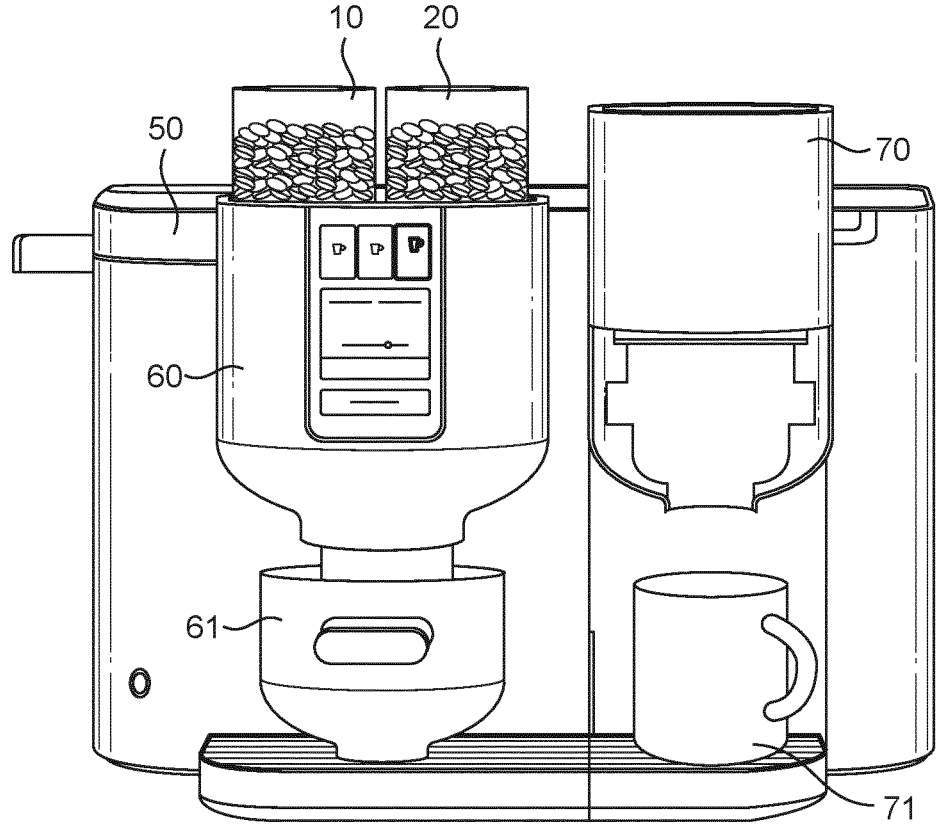
FIG. 17 is a schematic representative view of the roasting, grinding, extraction system in FIG. 7, showing the dispensing of grinded coffee for the further preparation of a beverage.
Figure 18:
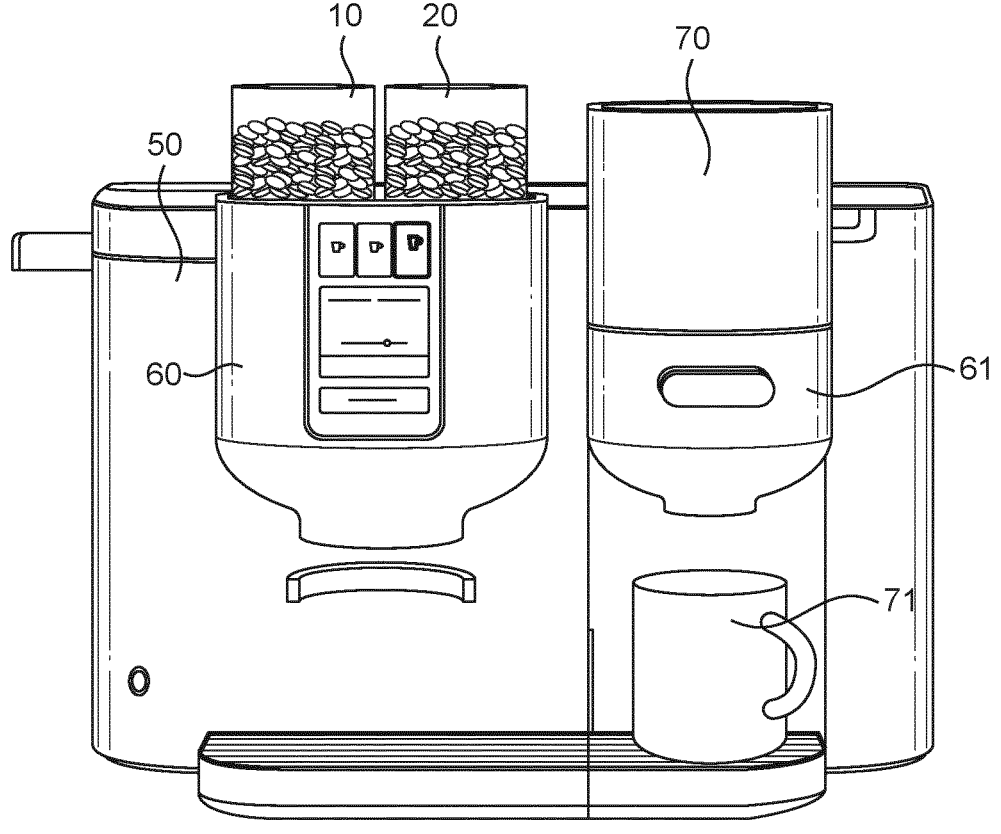
FIG. 18 is a schematic representative view of the roasting, grinding, extraction system in FIG. 17, showing the grinded coffee arranged in the preparation device, ready to prepare a beverage.

FIG. 16 shows schematically the roasting step in the system of the invention. Once the roasting is finished, grinding takes place (FIG. 18) and the grinded coffee (coffee blend) is sent into a product holder 61 (FIG. 17) that will be then plugged into a preparation or extraction device 70: the beverage preparation in the preparation or extraction device 70 and its delivery into a cup 71 is shown in FIG. 15.

Figure 19:
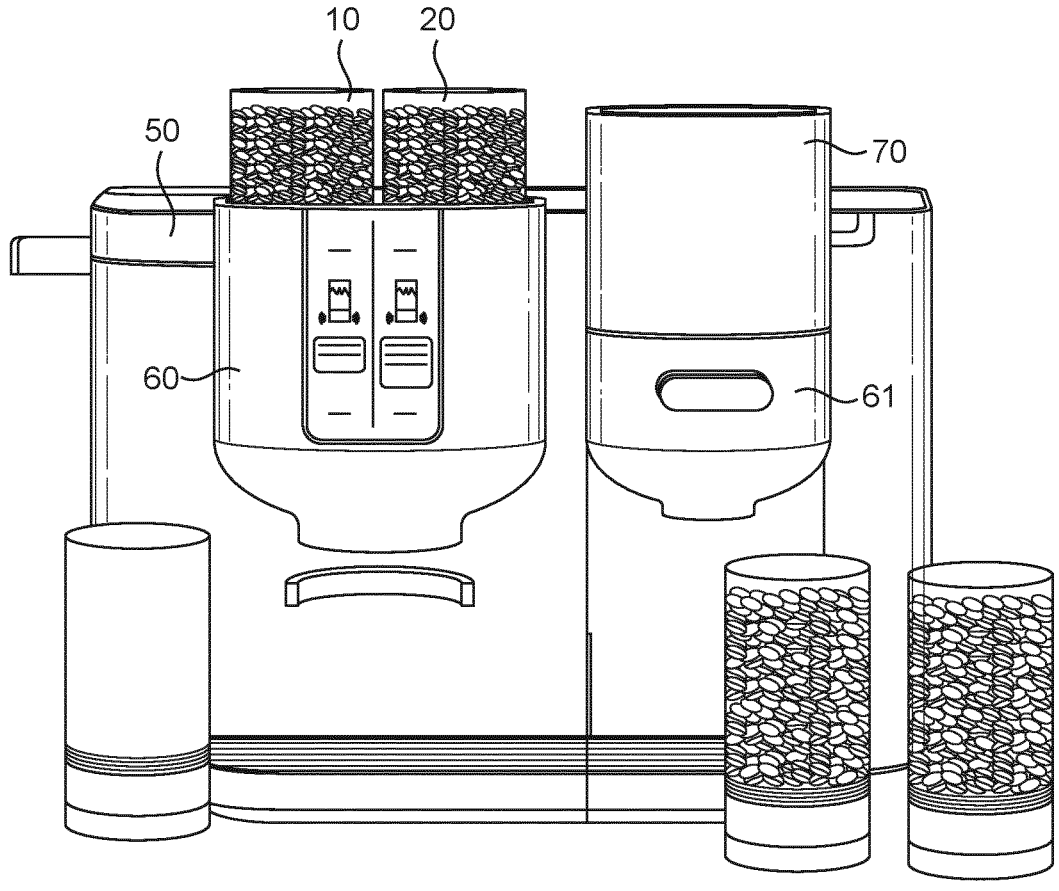
FIG. 19 is a schematic representative view of the roasting, grinding, extraction system in FIG. 7, showing the possibility of plugging in the grinding device several containers comprising different types of coffee beans.
Figure 20:
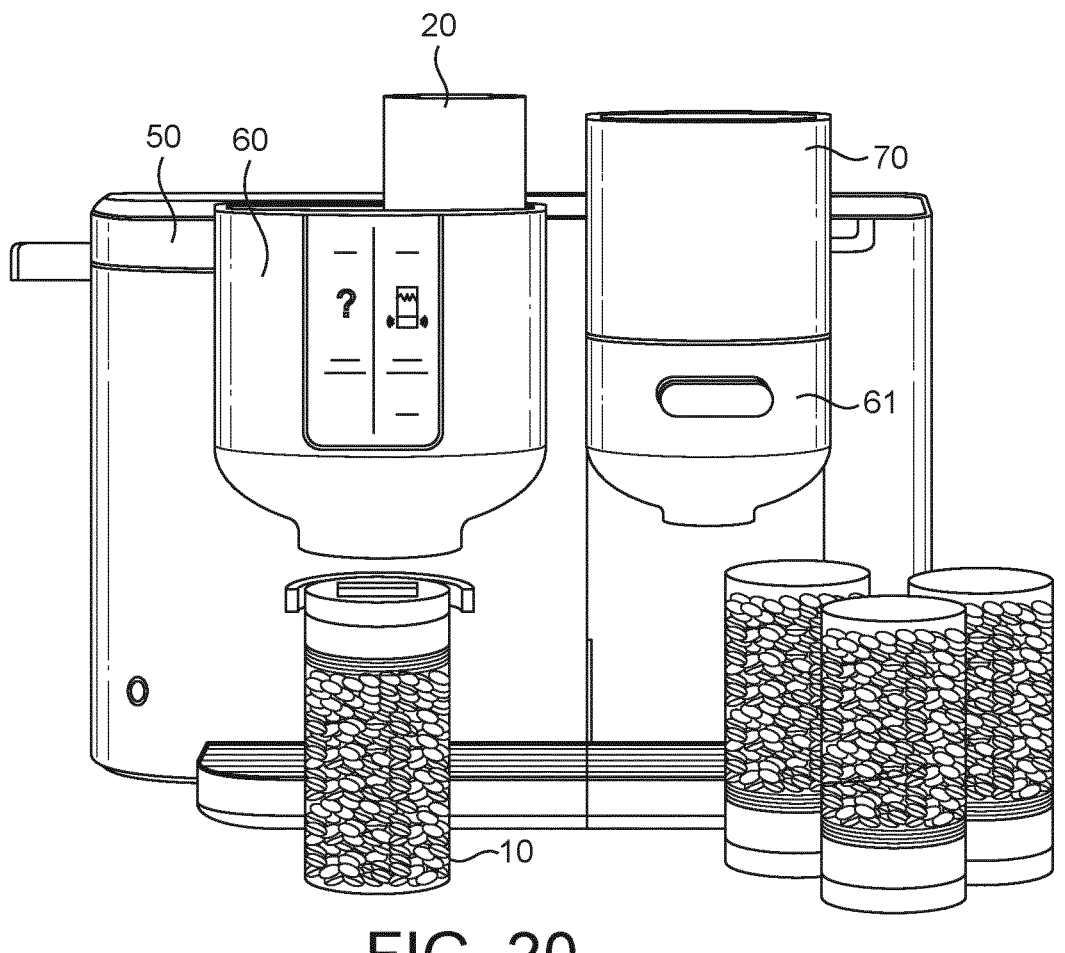
FIG. 20 is a schematic representative view of the roasting, grinding, extraction system in FIG. 7, showing different containers comprising different types of coffee beans that can be plugged in the grinding device in order to obtain different coffee blends.

FIGS. 19 and 20 show schematically different types of coffee beans that can be in different containers 10, 20 so different coffee blends can be prepared. The system of the invention allows a high versatility and the containers 10, 20 can be quickly plugged and unplugged in the grinding or dispensing device 60 (plug and play type system).

According to a second object, the invention relates to a method for roasting and grinding coffee beans using a roasting and grinding apparatus as the one described.

According to a third object, the invention further relates to the use of a roasting and grinding apparatus as the one described for delivering a blend of roasted and grinded coffee beans in a certain quantity.

It should be clear to a skilled person that the embodiments shown in the figures are only preferred embodiments, but that, however, also other designs of a system can be used.

The invention claimed is:

1. A dispensing and preparation system for powdered food or beverage products, comprising a dispensing device and an associated preparation device, wherein:

the dispensing device comprises:
  one or more housings configured to receive one or more containers with a powdered food or beverage product;
  a reader configured to obtain product parameters of the powdered food or beverage product from the one or more containers;
  a control unit configured to dispense a certain amount of the powdered food or beverage product from the one or more containers according to these product parameters and/or according to a recipes database as a function of a beverage to be prepared; and
  an encoder to encode the product parameters on a programmable first identification member on a product holder in the dispensing device, to which the powdered food or beverage product is dispensed; and
the preparation device is configured to receive the product holder and comprises:
  a reader to identify the product parameters in the first identification member, and
  a control unit configured to cause the preparation device to extract the beverage according to the product parameters retrieved from the product holder and/or beverage information retrieved from a beverage database in this control unit.

2. The system of claim 1 wherein the product parameters are selected from the group consisting of: product type, product origin, date of production, production data, list of ingredients, date of expiration, company data and marketing info.

3. The system of claim 1 wherein the beverage information comprises one or a plurality of the following data: beverage type and associated preparation process, beverage volume, beverage temperature and extraction pump profile.

4. The system of claim 1 wherein the product holder comprises a plugging apparatus to be plugged and/or unplugged onto the dispensing device and onto the preparation device so that the product holder is freely exchangeable.

5. The system of claim 1 wherein the product holder is configured to be locked on the dispensing device and on the preparation device during the dispensing and the extraction operations, respectively.

6. The system of claim 1 wherein the containers with the powdered food or beverage products comprise a second identification member with the product parameters of these powdered food or beverage products, to be read by the reader in the dispensing device, the second identification member being optical.

7. The system of claim 1 wherein the one or more containers have an embedded dosing device to dose only the needed quantity of powdered food or beverage product into the product holder.

8. The system of claim 1 wherein the one or more containers comprise an oxygen and/or humidity and/or light barrier during storage and/or dispensing.

9. The system of claim 1 wherein the one or plurality of containers are airtight, allowing no air exchange with the product during storage and/or dispensing.

10. The system of claim 7 wherein the dispensing device comprises a motor and a drive to control the embedded dosing device of the one or plurality of containers to dose only the needed dose of powdered food or beverage product into the product holder.

11. The system of claim 1 wherein the reader of the dispensing device comprises a RFID tag reader to obtain the product parameters of the powdered food or beverage products of the one or more containers connected to it.

12. The system of claim 1, wherein the one or more containers with the powdered food or beverage product is included as part of the system.

13. A method for dispensing powdered food or beverage products and preparing a beverage from them using a dispensing and extraction apparatus, the method comprising the following steps:
  reading product parameters in one or more containers;
  dispensing a quantity of powdered food or beverage product from the one or more containers into a product holder while the containers are plugged in a dispensing device, according to the product parameters and/or according to a recipes database;
  encoding the product parameters on the product holder using an encoder in the dispensing device;
  transferring the product holder to an extraction device manually or automatically; and
  reading the product parameters from the product holder using the extraction device and extracting the beverage according to the product parameters and/or beverage information retrieved from a beverage database.

* * * * *